United States Patent
Chen et al.

(10) Patent No.: US 8,180,224 B2
(45) Date of Patent: May 15, 2012

(54) METHOD, APPARATUS AND SYSTEM FOR TRANSMITTING ETHERNET SIGNALS IN OPTICAL TRANSPORT NETWORK

(75) Inventors: Ming Chen, Shenzhen (CN); Qiuyou Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 502 days.

(21) Appl. No.: 12/430,471

(22) Filed: Apr. 27, 2009

(65) Prior Publication Data

US 2009/0208208 A1  Aug. 20, 2009

Related U.S. Application Data

(63) Continuation of application No. PCT/CN2008/000189, filed on Jan. 25, 2008.

(30) Foreign Application Priority Data

Feb. 9, 2007 (CN) ........................ 2007 1 0063783

(51) Int. Cl.
*H04J 14/04* (2006.01)
(52) U.S. Cl. ........................................ 398/100; 398/99
(58) Field of Classification Search .............. 398/99–100
See application file for complete search history.

(56) References Cited

U.S. PATENT DOCUMENTS

2003/0056017 A1   3/2003   Gonda

FOREIGN PATENT DOCUMENTS

| CN | 1471244 A | 1/2004 |
|---|---|---|
| CN | 1747606 A | 3/2006 |
| CN | 1747606 A | 3/2006 |
| CN | 1852215 A | 10/2006 |
| EP | 1 826 926 A1 | 12/2005 |
| EP | 1 881 669 A1 | 1/2008 |
| WO | WO 2006/063521 A1 | 6/2006 |

OTHER PUBLICATIONS

First Chinese Office Action dated (mailed) Dec. 3, 2010, issued in related Chinese Application No. 200710063783.8 Huawei Technologies Co., LTD.

(Continued)

*Primary Examiner* — Leslie Pascal
(74) *Attorney, Agent, or Firm* — Finnegan, Henderson, Farabow, Garrett & Dunner LLP

(57) ABSTRACT

A method, apparatus and system for transmitting Ethernet signals in an OTN are provided. The method may include: mapping the Ethernet signals to timeslot units, where a VCG composed of multiple OPUs is divided into the timeslot units; mapping the Ethernet signals into the OPUs, and then mapped into OTUs and output to the OTN for transmitting. In this way, the Ethernet signals may be transmitted in the OTN transparently. The apparatus may further include: a first adaptation protocol frame mapping module, a first virtual concatenation module, and a first line terminal module, which convert the Ethernet signals to the OTUs. The system may include a first adaptation protocol frame mapping module, a second adaptation protocol frame mapping module, a first virtual concatenation module, a second virtual concatenation module, a first line terminal module, and a second line terminal module, which convert the Ethernet signals to the OTUs and vice versa.

9 Claims, 4 Drawing Sheets

OTHER PUBLICATIONS

ITU-T G.709/Y.1331 Series G: Transmission Systems and Media, Digital Systems and Networks, Digital terminal equipments -General; Series Y: Global Information Infrastructure, Internet Protocol Aspects and Next Generation Networks. Internet protocol aspects- Transport, International Telecommunication Union, Mar. 2003.

International Search Report from P.R. China in International Application No. PCT/CN2008/000189 mailed May. 15, 2008.

Extended European Search Report for Application No. 08700734.0, dated Nov. 12, 2009.

ITU-T, Interfaces for Optical Transport Network (OTN), ITU-T Telecommunication Standardization Sector of ITU,, Mar. 2003, G.709/Y.1331, Geneva, CH, 118 pages.

METHOD, APPARATUS AND SYSTEM FOR TRANSMITTING ETHERNET SIGNALS IN OPTICAL TRANSPORT NETWORK

CROSS-REFERENCE TO RELATED APPLICATIONS

This application is a continuation of international application number PCT/CN2008/000189, filed on Jan. 25, 2008, which claims priority to the Chinese Patent Application No. 200710063783.8, filed with the Chinese Patent Office on Feb. 9, 2007, and entitled "A method, Apparatus and System for realizing transmitting Ethernet signal in the optical transport network," both of which are incorporated herein by reference in their entirety.

TECHNICAL FIELD

The present invention relates to Optical Transport Network (OTN) transmission technology and, in particular, to a method, apparatus, and system for transmitting Ethernet signals in an OTN.

BACKGROUND

Synchronous Digital Hierarchy (SDH) is based on time division multiplexing technology, and provides a time division multiplexing transmission channel of a fixed bandwidth. However, with the rapid development of data communication and in view of the burst feature and unpredictability of data services, currently applied SDH technology is less and less adaptable to explosively growing data services.

In order to meet the requirements of explosively growing data services, the International Telecommunications Union-Telecommunications (ITU-T) integrated some features of SDH technology with the bandwidth extension technology of the Dense Wavelength Division Multiplexing (DWDM) to formulate the OTN standard series. The OTN technology includes electrical-layer and optical-layer technical specifications, and provides a Tandem Connection Monitoring (TCM) processing method and a Forward Error Correction (FEC) method to schedule and manage high-capacity services flexibly.

Currently, in order to transmit high-capacity data, more and more services use an OTN to transmit data. For example, 100G Ethernet, representative of the mainstream Metropolitan Area Network (MAN) technologies, adapts to the signals transmitted on the OTN in the following two methods.

The first method adapts the 100GE signals for a Virtual Concatenation Group (VCG) composed of 11 Optical channel Payload Units (OPUs) whose rate level is 2 (namely, the rate is 10 Gbps) (OPU2-11v). More specifically, the adaptation may include, decoding the 100GE signals, encapsulating the decoded signals through a General Framing Procedure (GFP), mapping the encapsulated signals to 11 OPU2 virtual concatenation units, and sending the signals to the OTN for transmitting.

The second method adapts the 100GE signals for a VCG composed of three OPUs whose rate level is 3 (namely, the rate is 40 Gbps) (OPU3-3v). Using the second method, the adaptation may include, decoding the 100GE signals, encapsulating the decoded signals through a GFP, mapping the encapsulated signals to three OPU3 virtual concatenation units, and sending the signals to the OTN for transmitting.

The aforementioned methods, however, have defects. For example, in the method which adapts the 100GE signals for the OPU2-11v, the signals of a 100 G bandwidth are adapted for an 11*2.5 G bandwidth, thus wasting a bandwidth of about 9.95 G. Moreover, the transmission cost is high because 11 chromatic wavelengths are occupied. Further, in the method which adapts the 100GE signals for the OPU3-3v, the signals of a 100 G bandwidth are adapted for a 3*40 G bandwidth, thus causing enormous bandwidth waste of about 20.45 G and reducing the transmission efficiency.

SUMMARY

A method, apparatus and system for transmitting Ethernet signals in an OTN are disclosed in various embodiments of the present disclosure to improve the bandwidth utilization ratio and reduce the transmission cost.

A method for transmitting Ethernet signals in an OTN consistent with some embodiments may include: mapping an Ethernet signal to an adaptation protocol frame; dividing a VCG composed of multiple OPUs into multiple timeslot units; mapping the adaptation protocol frame to the timeslot units; and mapping the mapped OPUs into Optical channel Transmission Units (OTUs), and outputting the OTUs to the OTN for transmitting.

In the foregoing solution, a VCG composed of multiple OPUs is divided into multiple timeslot units adaptable to Ethernet signals so that Ethernet signals are mapped to the OPUs, and then mapped to the OTUs and output to the OTN. Therefore, the Ethernet signals may be transmitted in the OTN transparently, the bandwidth utilization ratio may be improved greatly, the wavelength utilization may be optimized, and the cost of transmitting Ethernet signals in the OTN may be reduced.

An apparatus for transmitting Ethernet signals in an OTN consistent with some embodiments may include: a first adaptation protocol frame mapping module, adapted to map an Ethernet signal into an adaptation protocol frame; a first virtual concatenation module, adapted to divide a VCG composed of multiple OPUs into timeslot units, and map the adaptation protocol frame to the timeslot units; and a first line terminal module, adapted to map the OPU into an OTU, and output the OTU to the OTN.

The first adaptation protocol frame mapping module in the foregoing apparatus solution performs adaptation protocol encapsulation for an Ethernet signal, the first virtual concatenation module maps the adaptation protocol frame into the VCG, and the first line terminal module maps the OPU into the OTU and transmits the OTU to the OTN, thus converting an Ethernet signal into an OTU. Afterward, the OTU is sent to the OTN, thus implementing transmission of an Ethernet signal in the OTN.

An apparatus for recovering an Ethernet signal from an OTU consistent with some embodiments may include: a second line terminal module, adapted to demap the OTU sent by the OTN into an OPU; a second virtual concatenation module, adapted to: assemble the OPUs that derive from demapping performed by the second line terminal module into a VCG, and demap the VCG into an adaptation protocol frame; and a second adaptation protocol frame mapping module, adapted to demap the adaptation protocol frame that derives from demapping performed by the second virtual concatenation module into an Ethernet signal, and output the signal to the Ethernet.

In the foregoing apparatus for recovering an Ethernet signal from the OTU, the second line terminal module demaps the OTU into an OPU, the second virtual concatenation module demaps the OPU into an adaptation protocol frame, and the second adaptation protocol frame mapping module converts the adaptation protocol frame into an Ethernet signal, and sends the signal to the Ethernet. In this way, the Ethernet signal is recovered from the OTU that bears the Ethernet signal, and sent to the Ethernet for further transmission.

A system for transmitting Ethernet signals in an OTN consistent with some embodiments may include: a first adaptation protocol frame mapping module, adapted to map an Ethernet signal into an adaptation protocol frame; a first virtual concatenation module, adapted to divide a VCG composed of multiple OPUs into timeslot units, and map the adaptation protocol frame to the timeslot units; a first line terminal module, adapted to map the OPU to an OTU, and output the OTU to the OTN; a second line terminal module, adapted to demap the OTU received from the OTN into an OPU, where the OTU is output by the first line terminal module to the OTN; a second virtual concatenation module, adapted to assemble the OPUs that derive from demapping performed by the second line terminal module into a VCG, and demap the VCG into an adaptation protocol frame; and a second adaptation protocol frame mapping module, adapted to demap the adaptation protocol frame that derives from demapping performed by the second virtual concatenation module into an Ethernet signal, and output the signal to the Ethernet.

Through the foregoing system for transmitting Ethernet signals in the OTN, an Ethernet signal may be sent to the OTN for transmission, and the Ethernet receives the OTU that bears the Ethernet signal.

The technical solution consistent with some embodiments is hereinafter described in detail by reference to accompanying drawings and preferred embodiments.

DETAILED DESCRIPTION

In the disclosed embodiments, an Ethernet signal such as 100GE signal is mapped to an adaptation protocol frame such as Generic Framing Procedure (GFP) frame, Link Access Procedure for SDH (LAPS) protocol frame, or High level Data Link Control (HDLC) protocol frame. Afterward, the adaptation protocol frame is mapped to a timeslot unit of a VCG composed of more than two OPUk's (k=1, 2, 3), respectively. Finally, the OPUk in the VCG with the mapped adaptation protocol frame is mapped to the OTUk (k=1, 2, 3) of the same rate. That is, if k=1, OPU1 is mapped to OTU1; if k=2, OPU2 is mapped to OTU2; if k=3, OPU3 is mapped to OTU3. Moreover, before the adaptation protocol frame is mapped to the timeslot unit, the VCG is divided into timeslot units adaptable to Ethernet signals. After the adaptation protocol frame is mapped to the timeslot units, the OPUk in the VCG bears the Ethernet signals carried in the adaptation protocol frame. After OPUk is mapped to OTUk, the signals are transmitted in the OTN through OTUk. Therefore, the Ethernet signals may be transmitted in the OTN transparently, thus reducing the wavelength occupation and improving the bandwidth utilization ratio.

Reference will now be made in detail to disclosed embodiments illustrated in the accompanying drawings.

Figure 1:
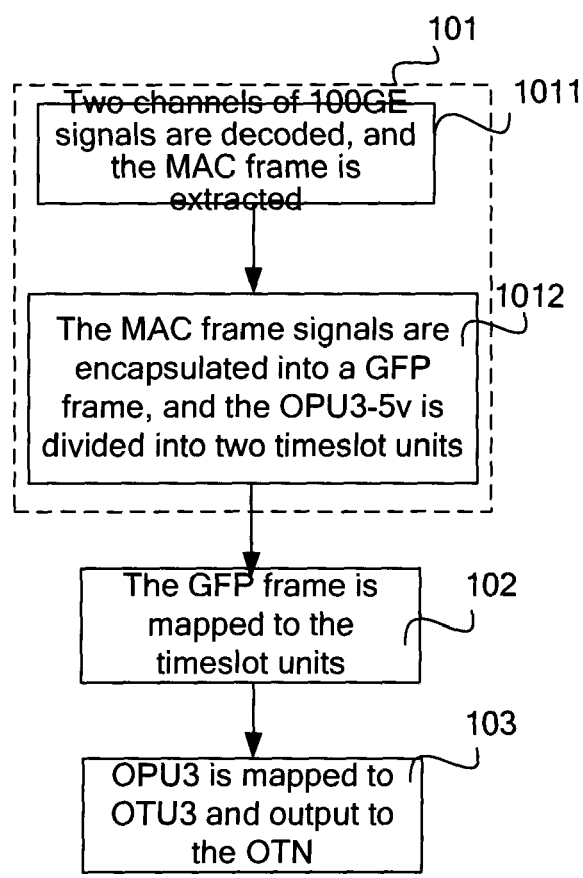
FIG. 1 is an exemplary flowchart of a method for transmitting Ethernet signals in an OTN consistent with some embodiments of the present disclosure.

FIG. 1 is an exemplary flowchart of a method for transmitting Ethernet signals in an OTN implementing embodiments consistent with some embodiments. Taking the transmission of 100GE signals in the OTN as an example, the detailed process may be as follows:

Step 101: Two channels of 100GE signals are mapped to adaptation protocol frames, respectively. The adaptation frame may be a GFP, LAPS, or HDLC protocol; or four channels of 100GE signals are mapped to adaptation protocol frames, which will not be detailed here any further. In this embodiment, the adaptation protocol may be GFP and the implementation may include at least the following two steps:

Step 1011: Two channels of 100GE signals undergo Physical Coding Sublayer (PCS) decoding. After the Inter-Packet Gap (IPG) information and preamble information are removed, two channels of MAC frames are extracted out.

Step 1012: The obtained two channels of MAC frame signals are encapsulated into two channels of GFP-Framing (GFP-F) signals respectively, or the MAC frame signals may be encapsulated into GFP-Transparent (GFP-T) frame signals as required, which will not be detailed any further.

Furthermore, connection sequence check bytes may be added in the reserved overhead bytes of the two channels of GFP-F frames respectively to check correctness of multiple channels of GFP frames mapped to the OPU3-5v timeslot units.

Figure 2:
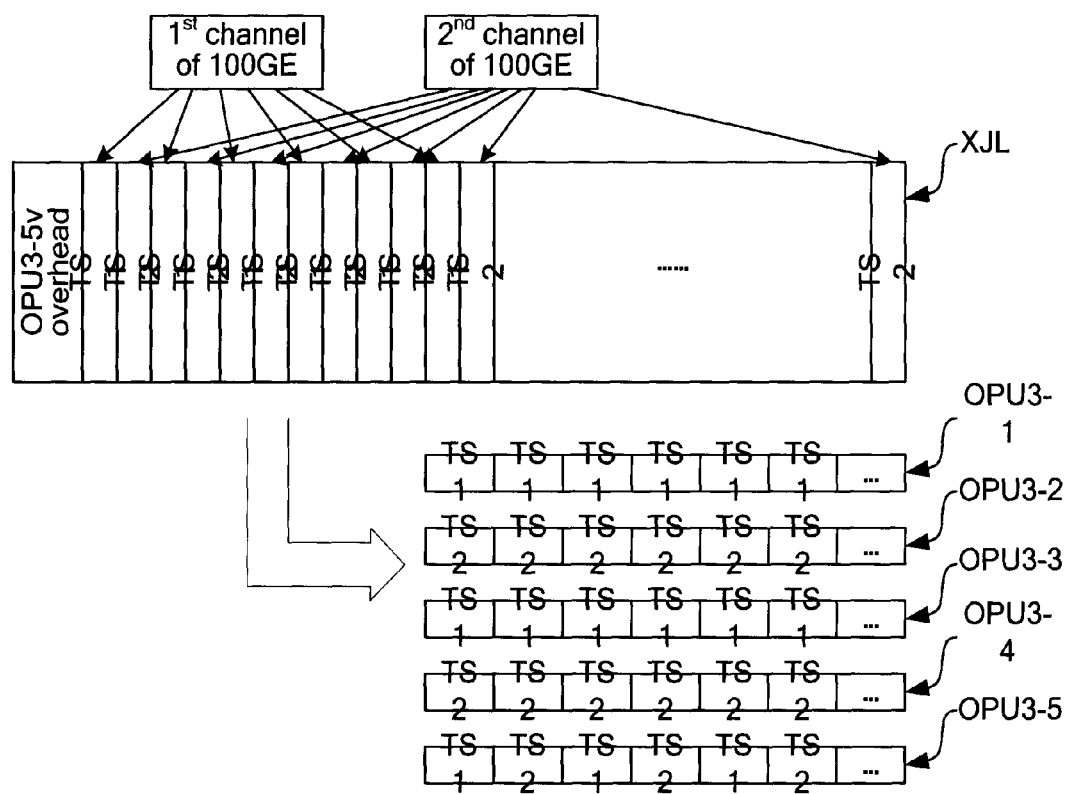
FIG. 2 shows an example of how an OPU3-5v is divided into timeslots consistent with some embodiments illustrated in FIG. 1.

During implementation of step 101, the VCG is divided into timeslots. Five OPUs with a level-3 rate (namely, OPU3) constitute a VCG, namely, OPU3-5v. The OPU3-5v is divided into two timeslot units TS1 and TS2, which correspond to 100GE signals respectively. FIG. 2 shows the division of an OPU3-5v composed of five OPU3's (namely, OPU3-1, OPU3-2, OPU3-3, OPU3-4, and OPU3-5). As shown in FIG. 2, the VCG (which is named "XJL") of the OPU3-5v is divided and the OPU3's are assigned into multiple timeslot units: OPU3-1 and OPU3-3 are assigned to the timeslot unit "TS1" corresponding to the first channel of 100GE signals; OPU3-2 and OPU3-4 are assigned to TS2 corresponding to the second channel of 100GE signals; and OPU3-5 adapts to the two channels of 100GE signals alternately, namely, OPU3-5 is assigned to TS1 and TS2 alternately. The rate of one OPU3 may be approximately 40 Gbps, the total rate of an OPU3-5v is 200.752595 Gbps±20 ppm, and the capacity of the payload area of TS1 and TS2 is 100.3762975 Gbps±20 ppm, which is greater than 100GE. Therefore, the MAC frames of the 100GE signals are fully bearable, and the MAC frames may be transmitted transparently. Moreover, when the link capacity may be adjusted through a Link Capacity Adjustment Scheme (LCAS), and the bandwidth of the two channels of 100GE signals may be adjusted by adjusting the quantity of OPU3's.

It should be noted that the division mode is not restricted. Other division modes may also applicable. For example, a VCG (OPU3-6v) composed of six OPU3's is divided into three timeslot units that adapt to 100GE signals respectively so that three channels of 100GE signals can be mapped to OTUs, which will not be detailed here any further. Moreover, the division of the VCG into timeslot units is not necessarily simultaneous to step 101, and may be performed anytime before the adaptation protocol frame is mapped to the timeslot unit, which will not be detailed here any further.

Step 102: The adaptation protocol frame may be mapped to the timeslot unit. The corresponding implementation mode may include a management frame is inserted into a GFP frame to implement management and maintenance for the GFP frame. Alternatively, when two channels of GFP frames are mapped and filled into TS1 and TS2 respectively, a certain number of idle frames may be inserted into the two channels of GFP frames, respectively, so that the rates of the two channels of GFP frames are equal to the rates of TS1 and TS2, respectively. In this way, the TS1 and TS2 in the OPU3-5v fully bear the MAC frames of the 100GE signals, respectively.

After the GFP frames are mapped to the OPU3, the quantity of the OPU3's in a VCG may be adjusted through an LCAS to control the link capacity. The specific implementation may include the following.

An LCAS may be configured through a Network Management System (NMS) so that the link capacity is adjusted to meet the customer requirements, for example, an OPU3-5v composed of five channel payload units.

Alternatively, according to the detected MAC frame traffic, the LCAS adjusts the link capacity between 1*OPU3 and 5*OPU3 in real time, and the bandwidth for transmitting the 100GE signals is adjusted by adjusting the quantity of OPUs in the VCG.

Step 103: The OPU3 is mapped into OTU3 and output to the OTN.

The five OPU3s in the OPU3-5v are assigned to five channels, and encapsulated into an Optical channel Data Unit (ODU) whose rate level is 3, namely, ODU3. Afterward, the ODU3 is encapsulated to form an OTU3, modulated to the optical media, and output to the OTN. The mapping between OPU3, ODU3 and OTU3 is described in the ITU-T G.709 recommendations. In the foregoing embodiments, after the 100GE signals are transmitted through the OTN to the receiving end, the method for transmitting Ethernet signals in the OTN consistent with some embodiments may further include: receiving the OTU sent from the OTN, and demapping the OTU into an OPU; corresponding to the process in FIG. 1, demapping the five channels of OTU3's of the MAC frame that bears two channels of 100GE signals into ODU3, and demapping the ODU3 into OPU3; demapping the VCG composed of OPUs to adaptation protocol frames; corresponding to the process in FIG. 1, demapping the OPU3-5v composed of five channels of OPU3's into two channels of GFP frames, or demapping it into LAPS frames or HDLC frames; demapping the adaptation protocol frames into Ethernet signals; corresponding to the process in FIG. 1, recovering the MAC frame signal from the GFP frame (if a connection sequence check byte is added into the GFP frame, the recovery process further includes connection sequence check); and afterward, inserting IPG information and preamble information into the MAC frame for PCS coding, and then generating Ethernet signals and output the signals to the Ethernet.

An apparatus for transmitting Ethernet signals in an OTN consistent with some embodiments may include: a first adaptation protocol frame mapping module, adapted to map an Ethernet signal to an adaptation protocol frame; a first virtual concatenation module, adapted to: divide a VCG composed of multiple OPUs into timeslot units, and map the adaptation protocol frame to the timeslot units; and a first line terminal module, adapted to: map the OPU into an OTU so that the OTU bears the Ethernet signal, and output the OTU to the OTN, thus implementing transmission of an Ethernet signal in the OTN.

In order to resend the Ethernet signal carried on the OTU transmitted in the OTN to the Ethernet, an apparatus for recovering the Ethernet signal from the OTU may apply. This apparatus may include: a second line terminal module, adapted to demap the OTU sent by the OTN into an OPU; a second virtual concatenation module, adapted to assemble the OPUs that derive from demapping performed by the second line terminal module into a VCG, and demap the VCG into an adaptation protocol frame; and a second adaptation protocol frame mapping module, adapted to demap the adaptation protocol frame that derives from demapping performed by the second virtual concatenation module into an Ethernet signal, and output the Ethernet signal to the Ethernet so that the Ethernet signal is recovered from the OTU which bears the Ethernet signal.

Figure 3:
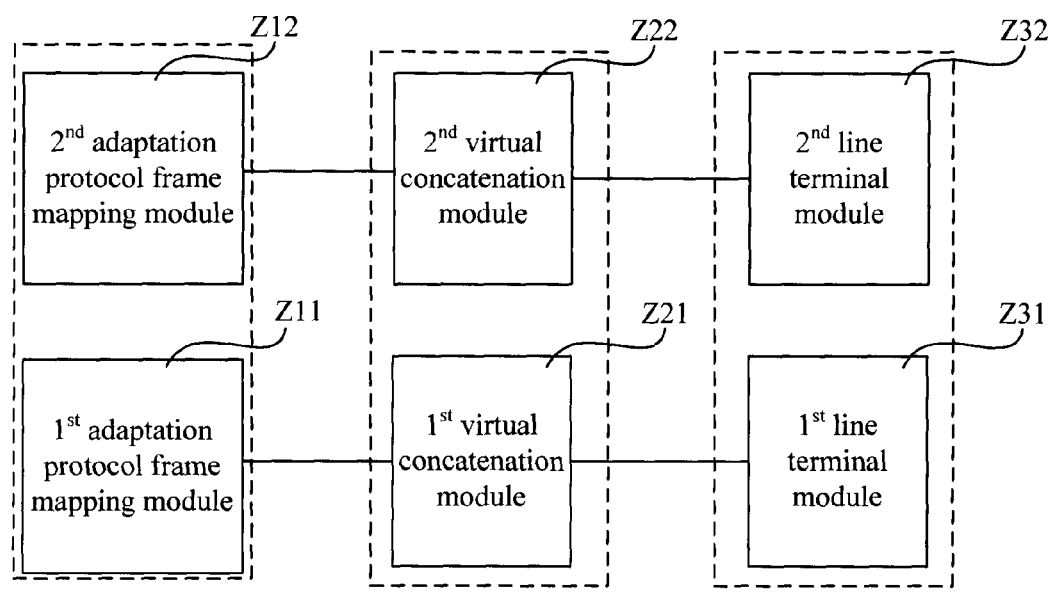
FIG. 3 shows an exemplary structure of an apparatus for transmitting Ethernet signals in an OTN consistent with some embodiments of the present disclosure.

FIG. 3 shows an exemplary structure of an apparatus for transmitting Ethernet signals in an OTN consistent with some embodiments. This apparatus includes: a first adaptation protocol frame mapping module Z11, a second adaptation protocol frame mapping module Z12, a first virtual concatenation module Z21, a second virtual concatenation module Z22, a first line terminal module Z31, and a second line terminal module Z32. In this embodiment, Z11 and Z12, Z21 and Z22, and Z31 and Z32 may be encapsulated together, respectively.

In the transmitting direction, the first adaptation protocol frame mapping module Z11 is adapted to map the Ethernet signal into an adaptation protocol frame, for example, map two channels of 100GE signals into an adaptation protocol frame such as GFP frame, LAPS frame or HDLC frame. The first adaptation protocol frame mapping module Z11 performs PCS decoding for the Ethernet signal sent by the Ethernet, extracts the MAC frame from the decoded signal, encapsulates the MAC frame into an adaptation protocol frame, and sends the adaptation protocol frame to the first virtual concatenation module Z21.

The first virtual concatenation module Z21 is adapted to divide a VCG composed of multiple OPUs into timeslot units, for example, divide a VCG composed of five OPUs into two timeslot units, and map the adaptation protocol frame to the timeslot units.

Figure 4:
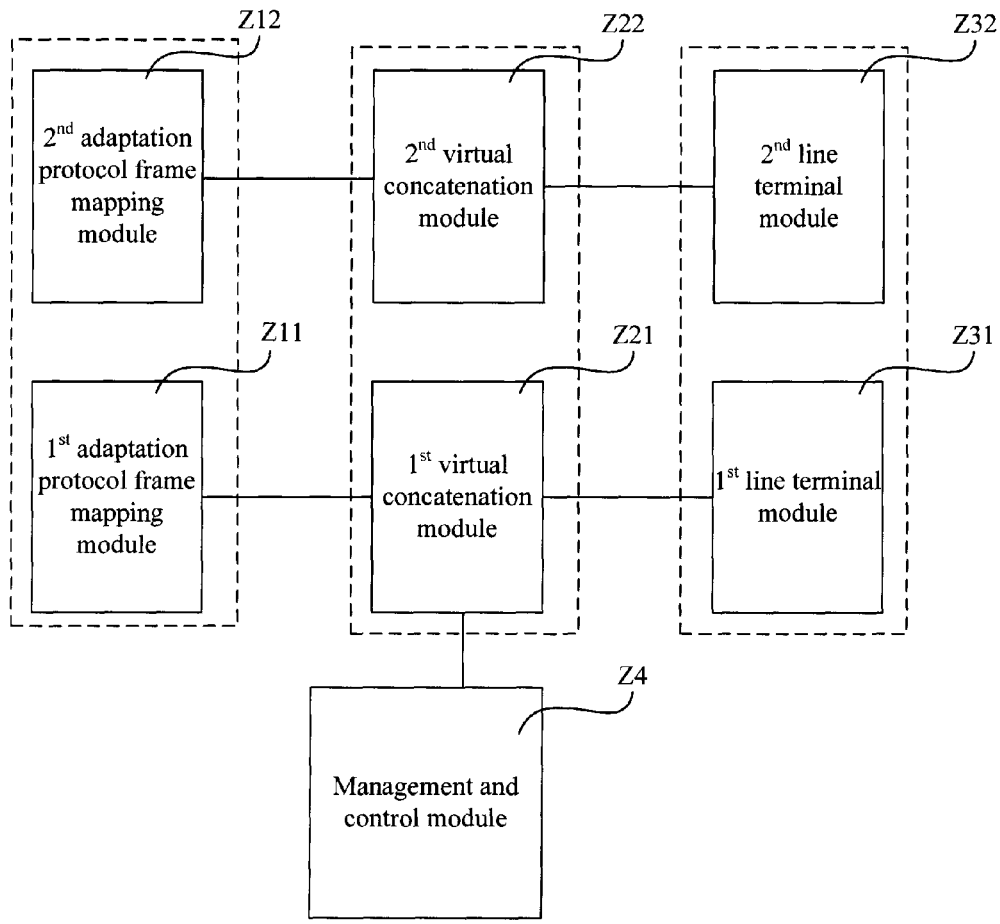
FIG. 4 shows an exemplary structure of an apparatus for transmitting Ethernet signals in an OTN consistent with some embodiments of the present disclosure.

Further, the first virtual concatenation module Z21 may also be connected with a management and control module Z4. As shown in FIG. 4, the management and control module Z4 generates a capacity control command according to the manually configured capacity parameters, and sends the command to the first virtual concatenation module Z21. The first virtual concatenation module Z21 adjusts the capacity of the link connected with the first line terminal module Z31 according to the capacity control command.

The first adaptation protocol frame mapping module Z11 may also detect the MAC frame traffic, and send the MAC frame traffic to the management and control module Z4. In this case, the management and control module Z4 calculates the optimum link capacity according to the traffic data sent by the first adaptation protocol frame mapping module Z11, generates a capacity control command, and sends the command to the first virtual concatenation module Z21. The first virtual concatenation module Z21 adjusts the capacity of the link connected with the first line terminal module Z31 according to the capacity control command.

The first line terminal module Z31 is adapted to map OPU3 into OTU3 after receiving the OPU3 sent by the first virtual concatenation module Z21, and output the OTU3 to the OTN.

In the receiving direction, the second line terminal module Z32 is adapted to receive the OTU3 from the OTN, and demap the OTU3 into OPU3. The second virtual concatenation module Z22 is adapted to receive the OPU3 from the second line terminal module Z32, assemble the OPU3 into a VCG, and demap the VCG into an adaptation protocol frame. The second adaptation protocol frame mapping module Z12 is adapted to demap the adaptation protocol frame that derives from demapping performed by the second virtual concatenation module Z22 into a MAC frame, insert IPG information and preamble information into the MAC frame, perform PCS encoding, generate an Ethernet signal, and output the signal to the Ethernet.

Figure 5:
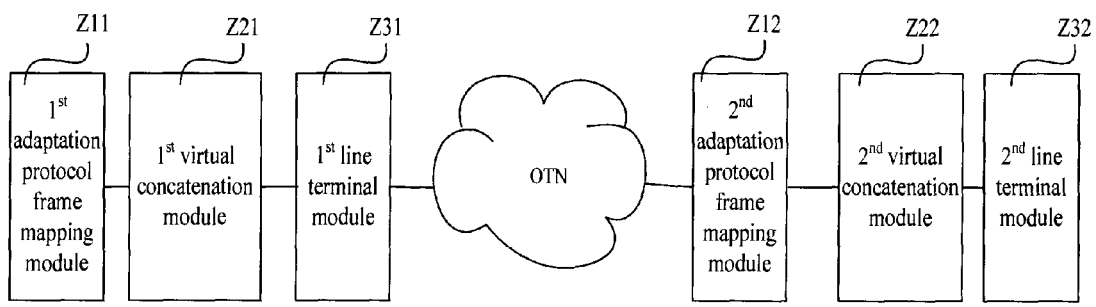
FIG. 5 shows an exemplary structure of a system for transmitting Ethernet signals in an OTN consistent with some embodiments of the present disclosure.

The first adaptation protocol frame mapping module Z11 and the second adaptation protocol frame mapping module Z12 may also be set on both sides of the OTN. In a similar manner, the first virtual concatenation module Z21 and the second virtual concatenation module Z22, and the first line terminal module Z31 and the second line terminal module Z32 may also be set on both sides of the OTN. As shown in FIG. 5, the first adaptation protocol frame mapping module Z11, the first virtual adaptation module Z21, and the first line terminal module Z31 are set on one side of the OTN to convert an Ethernet signal to an OTU, and send the OTU to the OTN. The second adaptation protocol frame mapping module Z12, the second virtual adaptation module Z22, and the second line terminal module Z32 are set on the other side of the OTN to recover the Ethernet signal from the OTU that bears the Ethernet signal, and may constitute a system where transmission of Ethernet signals in the OTN may be implemented.

At the transmitting end of the OTN, the first adaptation protocol frame mapping module Z11 is adapted to map an Ethernet signal into an adaptation protocol frame. The first virtual concatenation module Z21 is adapted to divide a VCG composed of multiple OPUs into timeslot units, and map the adaptation protocol frame to the timeslot units. The first line terminal module Z31 is adapted to map the OPU into an OTU, and output the OTU to the OTN.

At the receiving end of the OTN, the second line terminal module Z32 is adapted to demap the OTU received from the OTN to an OPU, where the OTU is output by the first line terminal module Z31 to the OTN. The second virtual concatenation module Z22 is adapted to assemble the OPUs that derive from demapping performed by the second line terminal module Z32 into a VCG, and demap the VCG into an adaptation protocol frame. The second adaptation protocol frame mapping module Z12 is adapted to demap the adaptation protocol frame that derives from demapping performed by the second virtual concatenation module Z22 into an Ethernet signal, and output the signal to the Ethernet.

In some embodiments, an OPU3-5v is divided into two timeslot units adaptable to the 100GE signals. After the two channels of adaptation protocol frames of the MAC frames mapped to the 100GE signals are mapped to the timeslot units, respectively, the five OPU3's in the VCG bear the MAC frames of the two channels of 100GE signals. Therefore, the 100GE signals may be transmitted in the OTN transparently, with one channel of 100GE signals occupying only 2.5 chromatic wavelengths. Accordingly, wavelength usage may be optimized, the bandwidth utilization ratio may be improved to 99.6%, and the cost of transmitting Ethernet signals on the OTN may be reduced. Through the first adaptation protocol mapping module, the first virtual concatenation module, the first line terminal module, and the apparatus for transmitting Ethernet signals in an OTN, the Ethernet signals may be converted to OTUs and sent to the OTN, thus implementing transmission of Ethernet signals in the OTN. Through the second adaptation protocol mapping module, the second virtual concatenation module and the second line terminal module, Ethernet signals are recovered from the OTUs that bear Ethernet signals, and sent to the Ethernet for further transmission.

The method for transmitting Ethernet signals in an OTN consistent with some embodiments may be implemented through independent software stored in a computer-readable storage media. For example, the software may be stored in a recording medium or a disk medium pluggable into a computer system driver; stored in a magnetic, optical or magneto-optical mode; or stored in a fixed recording medium such as hard disk drive in a computer system, or a solid-state computer memory. During execution of the software, the Ethernet signals or OTU signals may be input into the computer system. By invoking and running the software, the computer system outputs and sends the OTU signals to the OTN for transmission, or outputs and sends Ethernet signals to the Ethernet for transmission.

The embodiments described above are only exemplary embodiments that are not intended to limit the protection scope of the present invention. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for transmitting Ethernet signals in an Optical Transport Network, OTN, comprising:
    mapping the Ethernet signals into adaptation protocol frames;
    dividing a Virtual Concatenation Group, VCG, composed of multiple Optical channel Payload Units, OPUs, into multiple timeslot units;
    mapping the adaptation protocol frames to the timeslot units; and
    mapping mapped OPUs into Optical channel Transmission Units, OTUs, and outputting the OTUs to the OTN for transmitting,
    wherein mapping the Ethernet signals into the adaptation protocol frames further comprises:
    adding a connection sequence check byte into a reserved overhead byte of the adaptation protocol frames.

2. The method according to claim 1, wherein mapping the Ethernet signals into the adaptation protocol frames comprises:
    mapping the Ethernet signals into the adaptation protocol frames through Generic Framing Procedure-Transparent, GFP-T, encapsulation or Generic Framing Procedure-Framing, GFP-F, encapsulation.

3. The method according to claim 2, further comprising:
    inserting an idle frame or adaptation protocol management frame into the adaptation protocol frames after the Ethernet signals are mapped into the adaptation protocol frames.

4. The method according to any one of claim 1, wherein dividing the VCG into the multiple timeslot units comprises:
    dividing the VCG into the multiple timeslot units adaptable to the Ethernet signals according to a rate of the Ethernet signals.

5. The method according to claim 4, wherein:
    the Ethernet signals are two channels of 100 GE signals;
    the VCG is composed of five OPUs whose rate level is 3; and
    the multiple timeslot units are two timeslot units.

6. The method according to any one of claim 1, wherein before the Ethernet frames are mapped into the adaptation protocol frames, the method further comprises:
adjusting a quantity of the OPUs in the VCG dynamically through a Link Capacity Adjustment Scheme, LCAS, according to preset parameters or current link traffic.

7. The method according to claim 1, further comprising:
receiving the OTUs sent from the OTN, and demapping the OTUs into the OPUs;
assembling the OPUs into the VCG, and demapping the VCG into the adaptation protocol frames; and
demapping the adaptation protocol frames into the Ethernet signals.

8. An apparatus for transmitting Ethernet signals in an Optical Transport Network, OTN, comprising:
a first adaptation protocol frame mapping module, configured to map Ethernet signals to adaptation protocol frames;
a first virtual concatenation module, configured to divide a Virtual Concatenation Group, VCG, composed of multiple Optical channel Payload Units, OPUs, into timeslot units, and map the adaptation protocol frames to the timeslot units; and
a first line terminal module, configured to map the OPUs into Optical channel Transmission Units, OTUs, and output the OTUs to the OTN,
wherein:
the apparatus further comprises a management and control module, configured to generate a capacity control command; and
the first virtual concatenation module is configured to adjust the capacity of a link between the first virtual concatenation module and the first line terminal module according to the capacity control command.

9. The apparatus according to claim 8, wherein:
the first adaptation protocol frame mapping module is further configured to detect traffic of the Ethernet signals; and
the management and control module is configured to generate the capacity control command for adjusting the capacity of the link according to the traffic of the Ethernet signals detected by the first adaptation protocol frame mapping module.

* * * * *